United States Patent
Nataraj et al.

(10) Patent No.: US 11,301,299 B2
(45) Date of Patent: Apr. 12, 2022

(54) DATA BASED SCHEDULING FOR HORIZONTALLY SCALABLE CLUSTERS

(71) Applicant: Hewlett Packard Enterprise Development LP, Houston, TX (US)

(72) Inventors: Pruthvi Panyam Nataraj, Bangalore (IN); Ajay Vishwanath Bhande, Bangalore (IN); Amit Kumar Gupta, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 425 days.

(21) Appl. No.: 16/174,487

(22) Filed: Oct. 30, 2018

(65) Prior Publication Data
US 2020/0133728 A1    Apr. 30, 2020

(51) Int. Cl.
*G06F 9/50*    (2006.01)
*G06F 9/48*    (2006.01)

(52) U.S. Cl.
CPC ............ *G06F 9/505* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 8,887,056 B2 * | 11/2014 | Breternitz | G06F 9/505 715/735 |
| 9,164,800 B2 | 10/2015 | Alicherry et al. | |
| 9,672,064 B2 * | 6/2017 | Gupta | G06F 9/5044 |
| 9,686,141 B2 * | 6/2017 | Soni | G06F 9/505 |
| 10,089,140 B2 * | 10/2018 | Gupta | G06F 9/5011 |
| 10,193,963 B2 * | 1/2019 | Gummaraju | G06F 16/182 |
| 10,305,747 B2 * | 5/2019 | Shahab | H04L 41/12 |
| 10,341,438 B2 * | 7/2019 | Jain | G06F 11/07 |
| 10,379,908 B2 * | 8/2019 | Vyas | G06F 11/3003 |
| 10,514,967 B2 * | 12/2019 | McClory | H04L 63/0281 |
| 2018/0046503 A1 | 2/2018 | Feng et al. | |
| 2018/0270125 A1 * | 9/2018 | Jain | H04L 41/0668 |
| 2018/0322437 A1 * | 11/2018 | McClory | G06F 8/41 |

OTHER PUBLICATIONS

Garg et al. "Migrating VM workloads to Containers: Issues and Challenges", 2018 IEEE, pp. 778-785.*

(Continued)

*Primary Examiner* — Van H Nguyen
(74) *Attorney, Agent, or Firm* — Sheppard Mullin Richter & Hampton LLP

(57) ABSTRACT

An apparatus can comprise a processor and a memory. The memory can store instructions that, when executed by the processor, cause the processor to associate a plurality of consumer containers with a data container. The plurality of consumer containers can host workloads that access a data segment hosted by the data container. The plurality of consumer containers and the data container can be scheduled on different nodes of a horizontally scalable cluster. A node of the horizontally scalable cluster that hosts the data container can be identified. The plurality of consumer containers can be scheduled to execute on the node based on the association between the plurality of consumer containers and the data container.

20 Claims, 5 Drawing Sheets

(56) References Cited

OTHER PUBLICATIONS

Bahrami et al. "Compliance-Aware Provisioning of Containers on Cloud", 2017 IEEE, pp. 696-700.*
U-chupala et al. "Container Rebalancing: Towards Proactive Linux Containers Placement Optimization in a Data Center", 2017 IEEE, pp. 788-795.*
Rabbit MQ by Pivotal, "Federated Queues", available online at <https://www.rabbitmq.com/federated-queues.html>, 2007, 5 pages.
Ying Mao et al., "DRAPS: Dynamic and Resource-Aware Placement Scheme for Docker Containers in a Heterogeneous Cluster", 2017 IEEE 36th International Performance Computing and Communications Conference (IPCCC), Dec. 2017, 9 pages.
Advanced Scheduling in Kuberneles, (Web Page), Mar. 31, 2017, 5 Pgs., https://kubernetes.io/blog/2017/03/advanced-scheduling-in-kubernetes/.
Collocate Compute and Data, (Web Page), Retrieved Jun. 6, 2018, 2 Pgs., https://apacheignite.readme.io/docs/collocate-compute-and-data.
Data-aware Scheduling, (Web Page), Retrieved Jun. 6, 2018, 7 Pgs., https://www.ibm.com/support/knowledgecenter/en/SSZUMP_7.2.0/management_sym/data_aware_scheduling.featureref.html.
Scheduler, (Web Page), Retrieved Jun. 6, 2018, 14 Pgs., https://docs.openshift.com/container-platform/3.4/admin_guide/scheduler.html#filter-the-nodes.

* cited by examiner

DATA BASED SCHEDULING FOR HORIZONTALLY SCALABLE CLUSTERS

BACKGROUND

A horizontally scalable cluster provides access to shared pools of system resources, with the ability to increase capacity. The system can include compute, network and storage devices. These devices can be virtual and/or physical devices.

DETAILED DESCRIPTION

Figure 1:
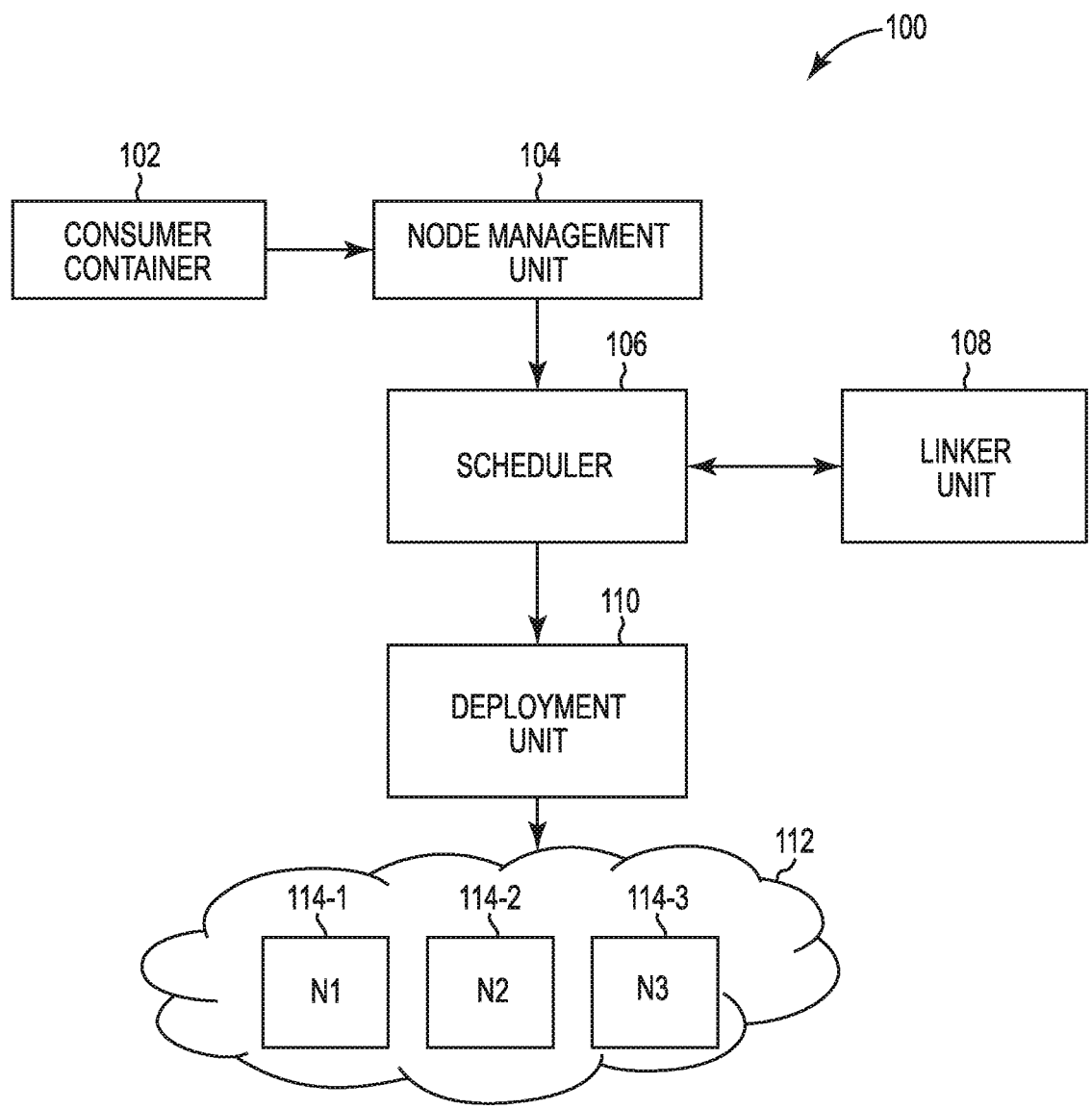
FIG. 1 illustrates a horizontally scalable cluster comprising a scheduler consistent with the disclosure.

The uniform and generic distribution and scheduling of workloads in a horizontally scalable cluster of nodes may be inefficient. There are multiple parameters which can impact the performance of a cluster of nodes in an interconnected system of resources (e.g., network, computing, storage, etc.). A number of examples describes performance optimization in a horizontally scalable cluster of nodes.

A cluster of nodes can be horizontally scalable if the cluster can increase its capacity by connecting multiple hardware or software resources to function as a single logical unit. The cluster can be hosted in a local deployment (e.g., on premise data center) and/or a cloud deployment. As used herein, a container is a logical unit that can be used to host data and/or workloads. A container can be hosted by a node. A container can be an operating system, a hypervisor, and/or a different type of logical unit. Data can be provided in data segments. A data segment is a logical unit of data with a unique identification (ID).

In horizontally scalable clusters, optimal performance can be achieved if the consumer containers hosting workloads are running on a same node where the data containers utilized by the workloads reside. In a clustered deployment, it may not be trivial identifying a node with a data container being used by a consumer container. The identification of a node with a data container may be complicated due to the use of multiple copies of the data and due to load balancers. If a consumer container hosts a work load that utilized a data segment hosted by a data container, then optimal performance can be achieved by hosting the consumer container on a same node as the data container.

However, horizontally scalable cluster systems may schedule a consumer container on any available node regardless of whether the data container is or isn't hosted on a given node. The horizontally scalable clusters may schedule a container on any available node and does not ensure that the consumer container runs on a same node which is hosting the corresponding data container.

Scheduling a container on any available node can cause significant overhead on consumer containers. The consumer containers may retrieve and process the data which is hosted on a different node. Retrieving data from different nodes can introduce overhead as compared to retrieving data from a same node. The overhead can include the latency of moving data from a data container to a consumer container via an overlay network.

In a deployment, a consumer container can fetch the data on the overlay network from the data container running on another node. The container can be scheduled to be hosted by a node that also hosts the data. In some examples, the schedule can be generated at deployment of the nodes and/or clusters. The data container and the consumer container can be scheduled and deployed on a same node.

The data container and the consumer container can be scheduled and deployed at different times. For example, the consumer container can be scheduled on a node after the data container is deployed to the same node. The consumer container can be scheduled and deployed responsive to the horizontal scaling of a cluster of nodes. The consumer container can also be scheduled responsive to the availability of the data on different nodes. For example, as a first copy of data (e.g., primary data segment) becomes unavailable in a first node and a second copy of the data (e.g., secondary data segment) becomes available on a second node, a consumer container can be moved from the first node to the second node.

In some examples, the horizontally scalable cluster can be static or dynamic. A static horizontally scalable cluster can be scheduled prior to runtime. Dynamic horizontally scalable clusters can be scheduled at runtime. A horizontally scalable cluster can be schedule prior to runtime if the assignment of containers to nodes is determined prior to runtime. A horizontally scalable cluster can be scheduled at runtime if the assignment of containers to nodes id determined at runtime. The assignment of containers to clusters can change over time in a dynamic horizontally scalable cluster. The examples described herein can be applicable to both static horizontally scalable clusters and dynamic horizontally scalable clusters.

The figures herein follow a numbering convention in which the first digit corresponds to the drawing figure number and the remaining digits identify an element or component in the drawing. For example, reference numeral 106 may refer to element "106" in FIG. 1 and an analogous element may be identified by reference numeral 206 in FIG. 2. Elements shown in the various figures herein can be added, exchanged, and/or eliminated to provide a number of additional examples. In addition, the proportion and the relative scale of the elements provided in the figures are intended to illustrate the examples described and should not be taken in a limiting sense.

FIG. 1 illustrates a horizontally scalable cluster 100 comprising a scheduler 106 consistent with the disclosure. The horizontally scalable cluster 100 can include a node management unit 104, a scheduler 106, a linker unit 108, a deployment unit 110, a network 112, and nodes N1 114-1, N2 114-2, and N3 114-3, referred to as nodes 114.

Although the network 112 is shown with the nodes 114, the network 112 can comprise a plurality of clusters where each of the clusters hosts a plurality of containers. Each of the clusters can be comprised of a plurality of nodes.

Each of the nodes 114 can host a plurality of data containers and/or consumer containers. In some examples, specific categories of data can be hosted by a single data container on a node. For example, the node N1 114-1 can host a first data container with a first category of data and the node N2 114-2 can host a second data container with a second category of data. In some examples, the node N1 114-1 can host the first data container with the first category of data and the second data container with the second category of data. Each of the data containers can host a category of data. For example, a first data segment having a category and a second data segment having the same category can be hosted by a container. If the consumer containers are placed in a node which hosts the corresponding category of data, then the processing performed for the workload hosted by the consumer containers can be performed faster than if the consumer containers were not placed in the node. If the consumer containers are not placed in a node which hosts the corresponding category of data, then there can be delays introduced due to network latency dealing with moving (e.g., copying) data from a node hosting the data to the node hosting the consumer containers.

In examples where the data containers and the nodes are static, the consumer containers can be co-placed on the same nodes as the nodes hosting the data containers. The co-placement of consumer containers and data containers can be carried out by labeling the containers and/or defining container associations. For example, the consumer container can be placed on a node based on the node's ID and whether the node hosts data containers that are accessed by the consumer container. As used herein, an association between the consumer containers and the data containers describes consumer containers that access the data containers.

However, nodes and/or clusters can experience failures such that a particular node may not host a particular data container. The nodes 114 can provide for failover and resiliency to provide access to the data containers by placing the consumer containers responsive to the unavailability of the data container on a particular node. Failover and resiliency can be provided by using a master/slave relationship between a node and a data segment.

In some examples, multiple copies of a data container and/or data segments can exist. For example, a first copy of a data container can reside in the node N1 114-1 and a second copy of the data container can reside in the node N2 114-2. As used herein, a node is a computing device in a cloud computing system. The node can include a physical node and/or a virtual node. The node can host data containers and/or consumer containers. The node can also provide node resources to the data containers and/or consumer containers. Node resources can include processing resources, network resources, and memory resources, among other types of resources.

One of the nodes can be labeled master of the data segment. For example, the node N1 114-1 can be master of the data segment hosted by a data container such that a consumer container that accesses the data segment is co-located in the node N1 114-1. If the first copy of the data segment becomes unavailable, then the node N2 114-2 can become master of the data segment given that the node N2 114-2 stores a second copy of the data segment. The consumer container can be moved (e.g., migrated) to the node N2 114-2 responsive to a change of a master of the data segment. A change of a master of the data segment can include assigning a different node as master of the data segment.

The consumer containers 102 can be provided to the node management unit 104. The node management unit 104 can comprise hardware or software to schedule and deploy the consumer containers 102 and/or data containers. The consumer containers 102 can host workloads such as applications that access data and/or perform operations utilizing the data. The data containers can host data provided as data segments where each of the data segments comprise data of the same type. In some examples, the data containers can host data provided as data segments where each of the data segments comprise data of different types. The first data segment may be associated with a first workload and/or consumer container while the second data segment is associated with a second workload and/or consumer container. A first application hosted by a first consumer container can access the first data segment from the data container and a second application hosted by a second consumer container can access a second data segment from the data container.

The consumer containers 102 can contain information used for scheduling and deployment purposes. The node management unit 104 can receive the scheduling information corresponding to the consumer containers 102 and/or can extract the scheduling information corresponding to the consumer containers 102. The scheduling information can include, for example, an ID of a data segment (e.g., data segment name), an ID of the consumer container (e.g., consumer container name), and/or an ID of a data container (e.g., data container name) hosting the data segment, if the ID of the data container is known.

The node management unit 104 can provide the scheduling information to the scheduler 106. The scheduler 106 can receive the scheduling information and utilize the scheduling information to link (e.g., associate) the ID of the data segment to a data container and/or a node hosting the data container. In some examples, the scheduler 106 can receive the scheduling information and utilize the scheduling information to link the ID of the data segment to a node that is master of corresponding data container.

For example, the scheduler 106 can provide the ID of the data segment to the linker unit 108. The linker unit 108 can resolve the ID of the data segment to a node that hosts the data segment or to a node that has availability to host the data segment. In some examples, the linker unit 108 can resolve the ID of the data segment to a master node that hosts the data segment or is scheduled to host the data segment. In examples where multiple copies of the data container are stored in different nodes, the linker unit 108 can resolve an ID of the data container to a node that is master of the data container. The scheduler 106 can return the ID of the node.

In some examples, the scheduler 106 can also schedule a data segment to a data container and/or a node hosting the data container. For example, the node management unit 104 can receive an ID of a data segment and a type of data corresponding to the data segment. Based on the data type, the scheduler 106 can generate a data container and/or can identify a data container corresponding to the data type. The scheduler 106 can provide the ID of the data segment and the ID of the data container that is available for hosting the data segment to the linker unit 108, the linker unit 108 can identify a node that hosts the data container or that is available to host the data container.

Figure 2:
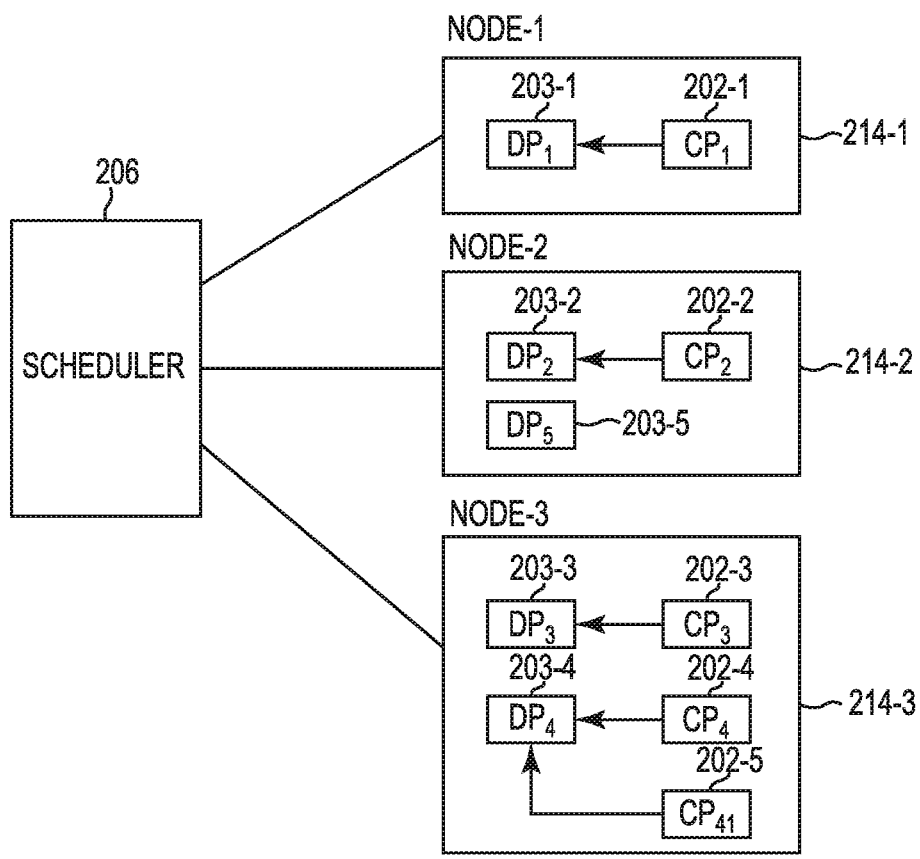
FIG. 2 illustrates an example provisioning of containers to nodes consistent with the disclosure.

The scheduler 106 can generate a schedule for the nodes. For example, the scheduler 106 can schedule the nodes to host the data containers and the consumer containers. FIG. 2 provides an example of the implementation of a schedule generated by the scheduler 106. For example, the scheduler 106 can schedule a first data container and a first consumer container on the node N1 114-1, a second data container, a fifth data container, and a second consumer container on the node N2 114-2, and a third data container, a fourth data container, a third consumer container, a fourth consumer container, and a fifth consumer container on the node N3 114-3.

Once the scheduler 106 binds the consumer container with a node, the scheduler 106 can provide the binding (e.g., ID of the consumer container and ID of the node) to the deployment unit 110. The deployment unit 110 can receive the ID of the consumer container and the ID of the node. The deployment unit 110 can instantiate the nodes 114 with corresponding consumer containers and data container. As used herein, instantiation refers to an initial booting and/or provisioning of a node and/or a container. The deployment unit 110 can deploy the nodes 114 with corresponding consumer containers after the data containers have been deployed to the nodes 114.

The data container and a corresponding consumer container may be deployed at different times. For example, a new consumer container may be deployed to the cluster 112 that comprises a node hosting corresponding consumer data. Multiple factors can lead to the deployment of data containers and corresponding consumer containers at different times. The consumer container or a workload hosted by the consumer container can malfunction such that the consumer container may be re-deployed to the node while the data container is not re-deployed to the node. The data container may be available for deployment before the consumer container such that the data container is deployed before the consumer container. A consumer container that accesses a data container, both of which are hosted by a node, can generate a workload using a new consumer container that also accesses the data container. The new consumer container can also be schedule on the node but deployed at a different time than the deployment of the node.

In some examples, a data container and the data segments hosted by the data container may become unavailable due to failure of the node. The node management unit 104 may identify the failure and/or may receive a notice of the failure. For example, the node that becomes unavailable may notify the node management unit 104 of its unavailability. The node management unit 104 can monitor the nodes to determine their status such that the node management unit 104 identifies the node as being unavailable. The node management unit 104 may re-deploy the containers hosted by the node. For example, the node management unit 104 may deploy consumer containers and/or data containers to different node(s). In examples where a node that becomes unavailable is assigned as master of a data segment, the node management unit 104 can reassign a different node (e.g., label a different node) as master of the data segment. The data container hosting the data segment may be re-deployed if no other copies of the data container are stored in different nodes. If copies of the data container hosting the data segment are hosted by a different node that is assigned as master, then the data container is not re-deployed but corresponding consumer containers may be re-deployed to the different node.

The deployment unit 110 can deploy the consumer containers and/or data containers on nodes that have previously been instantiated. The deployment unit 110 can deploy a workload to a container and/or a data segment to a data container. The deployment unit 110 can deploy the consumer container, the data container, and/or a node based on the schedule provided by the scheduler 106.

FIG. 2 illustrates an example provisioning of containers to nodes consistent with the disclosure. FIG. 2 includes the scheduler 206 and the nodes Node-1 214-1, Node-2 214-2, and Node-3 214-3. FIG. 2 also includes a data container 203-1 ($DP_1$), a data container 203-2 ($DP_2$), a data container 203-3 ($DP_3$), a data container 203-4 ($DP_4$), and a data container 203-5 ($DP_5$), referred to as data containers 203.

FIG. 2 further includes a consumer container 202-1 ($CP_1$), a consumer container 202-2 ($CP_2$), a consumer container 202-3 ($CP_3$), a consumer container 202-4 ($CP_{40}$), and a consumer container 202-5 ($CP_{41}$), referred to as consumer containers 202.

The node 214-1 can host the data container 203-1 and the consumer container 202-1. The node 214-2 can host the data containers 203-2 and 203-5 and the consumer container 202-2, the node 214-3 can host the data containers 203-2 and 203-4 and the consumer containers 202-3, 202-4, and 202-5.

The scheduler 206 can schedule the data containers 203 and the consumer containers 202 at different times. The data containers 203 can be scheduled and/or deployed before the consumer containers 202 are scheduled and/or deployed. For example, the data container 203-4 can be schedule before the consumer container 202-4 is deployed. The consumer container 202-5 can be scheduled and/or deployed after the consumer container 202-4 and the data container 203-4 are scheduled and/or deployed.

In some examples, multiple consumer containers can access data segments stored in a single data container. For example, the node 214-3 hosts a data container 203-4 that can be accessed by multiple consumer containers 202-4 and 202-5.

Each of the nodes 214 can be master nodes. Specifically, each of the nodes 214 can be master nodes simultaneously for different data segments hosted by different data containers. For example, the node 214-1 can be a master of a data segment hosted by the data container 203-1, the node 214-2 can be a master of a data segment hosted by the data container 203-2, the node 214-3 can be a master of a plurality of segments hosted by the data containers 203-3 and 203-4.

The scheduler 206 can schedule nodes based on whether the nodes are master nodes or non-master nodes. The scheduler 206 can also schedule nodes based on whether the nodes are masters of the data segments hosted by themselves versus other nodes that are not scheduled by scheduler 206. For example, the data container 203-4 can be a first copy and the data container 203-5 can be a second copy of a data container 203-4. The node 214-3 can be master of a data segment hosted by the data container 203-4. Responsive to the node 214-3 being the master of the data segment hosted by the data container 203-4 the scheduler 206 can schedule the consumer containers 202-4 and 202-5 on the node 214-3. Responsive to the unavailability of the data container 203-4, the node 214-2 can be labeled as master of a data segment hosted by the data container 203-5 because the data container 203-5 hosts the second copy of the unavailable data container 203-4. Accordingly, the scheduler 206 can re-deploy the consumer containers 202-4 and 202-5 on the node 214-2. If the node 214-3 becomes unavailable, the scheduler 206 can also re-deploy the data container 203-3 and the consumer container 202-3.

Figure 3:
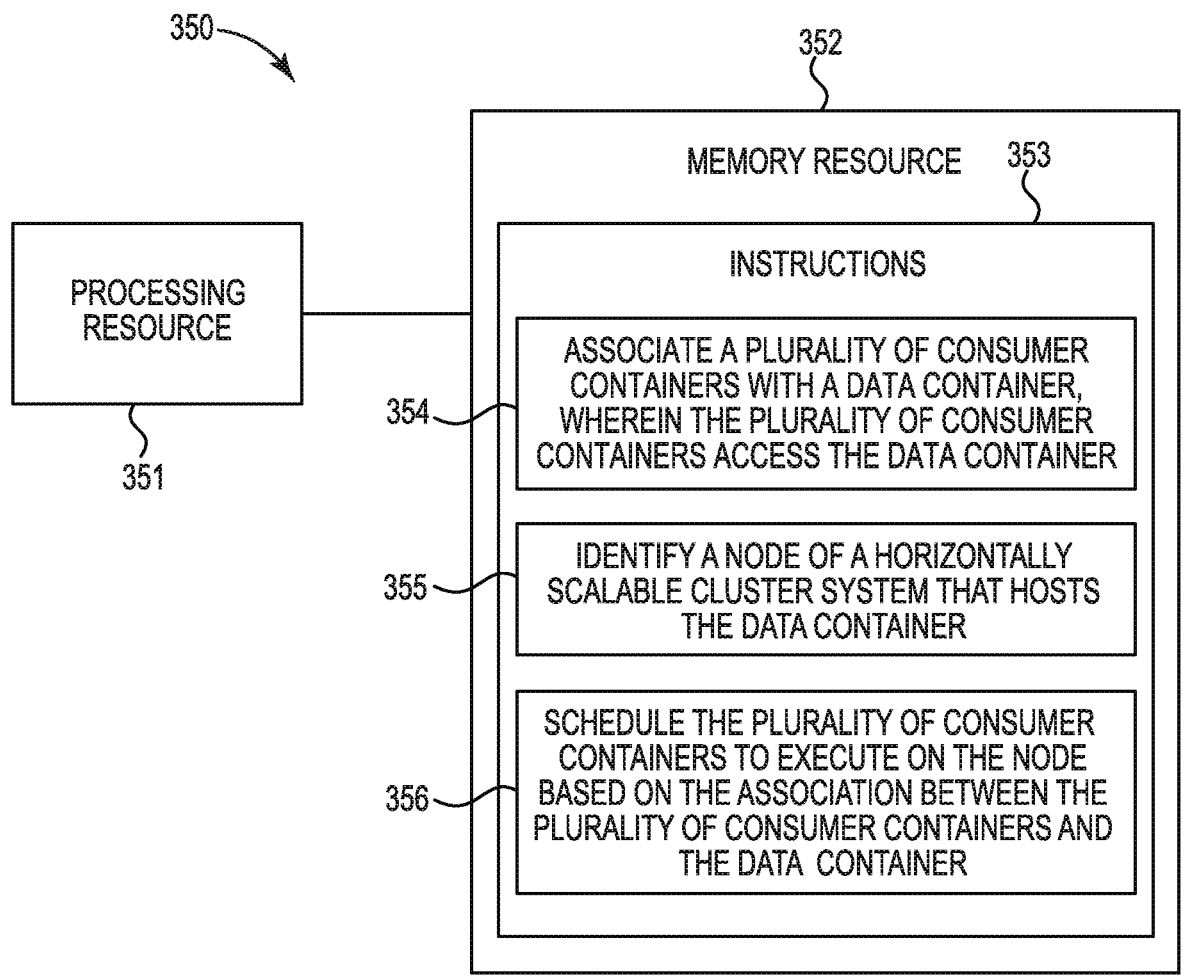
FIG. 3 illustrates an example of an apparatus for scheduling containers on nodes consistent with the disclosure.

FIG. 3 illustrates an example of an apparatus 350 for scheduling containers on nodes consistent with the disclosure. As shown in FIG. 3, the apparatus 350 includes a processing resource 351 and a memory resource 352.

The processing resource 351 may be a hardware processing unit such as a microprocessor, application specific instruction set processor, coprocessor, network processor, or similar hardware circuitry that can cause machine-readable instructions to be executed. In some examples, the processing resource 351 may be a plurality of hardware processing units that can cause machine-readable instructions to be executed. The processing resource 351 can include central processing units (CPUs) and/or graphics processing units (GPUs), among other types of processing units. The memory resource 352 may be any type of volatile or non-volatile memory or storage, such as random access memory (RAM), flash memory, read-only memory (ROM), storage volumes, a hard disk, or a combination thereof.

The memory resource 352 may store instructions 353 thereon. When executed by the processing resource 351, the instructions 353 may cause the apparatus 350 to perform specific tasks and/or functions. For example, at block 354, the memory resource 352 may store instructions 353 which may be executed by the processing resource 351 to cause the apparatus 350 to associate a plurality of consumer containers with a data container, wherein the plurality of consumer containers accesses the data container. The association between the plurality of consumer containers and the data containers can include an identification of data containers and consumer containers that access the data containers. For example, if a workload hosted by a consumer container accesses a data segment of a data containers, then the consumer container and the data container are associated.

At block 355, the memory resource 352 may store instructions 353 which may be executed by the processing resource 351 to cause the apparatus 350 to identify a node of a horizontally scalable cluster that hosts the data container. A linker unit can resolve data containers to nodes. The linker unit can, for example, resolve data containers to nodes and nodes to data containers using a table or different object to link nodes to data containers and data containers to nodes.

At block 356, the memory resource 352 may store instructions 353 which may be executed by the processing resource 351 to cause the apparatus 350 to schedule the plurality of consumer containers to execute on the node based on the association between the plurality of consumer containers and the data container. The schedule can be an assignment of containers to nodes. For example, a consumer container can be scheduled to execute on a node, if the consumer container is assigned to be hosted by the node.

In some examples, the consumer container can also be associated with a data segment hosted by the data container. The plurality of consumer containers can be scheduled to execute on the node based on the association between the data segment of the data container and the plurality of consumer containers. The node of the horizontally scalable cluster can be identified based on the data segment. For example, the data segment can be used to identify a data container that hosts the data segment. The data container can be used to identify a node that hosts the data container.

The nodes can comprise at least one of a physical computing node and/or a virtual computing node. The nodes can be coupled to a network. The nodes can belong to a cluster of nodes.

The data container can be a logical container for data segments of a same type. That is the data segment can host a plurality of data segments of a same type or sharing a same characteristic.

The plurality of consumer containers can be logical containers to access data segments. The consumer container can host a plurality of workloads in the form of applications. The applications can access the data containers to access data segments.

The horizontally scalable cluster can deploy the plurality of consumer containers and the data container on the node based on the schedule. The horizontally scalable cluster can deploy the plurality of consumer containers at different times.

In some examples, identifying the node that hosts the data container can also include identifying a node that hosts the data container and is master of a data segment hosted by the data container. For example, multiple nodes may host a data container or copies of the data container, but one of the nodes may be master of the data segment hosted by the data container while the other nodes host the data container for redundancy purposes. The plurality of consumer containers can be scheduled to execute on the node based on the association between the plurality of consumer containers and the data container and the node being master of a data segment hosted by the data container.

Figure 4:
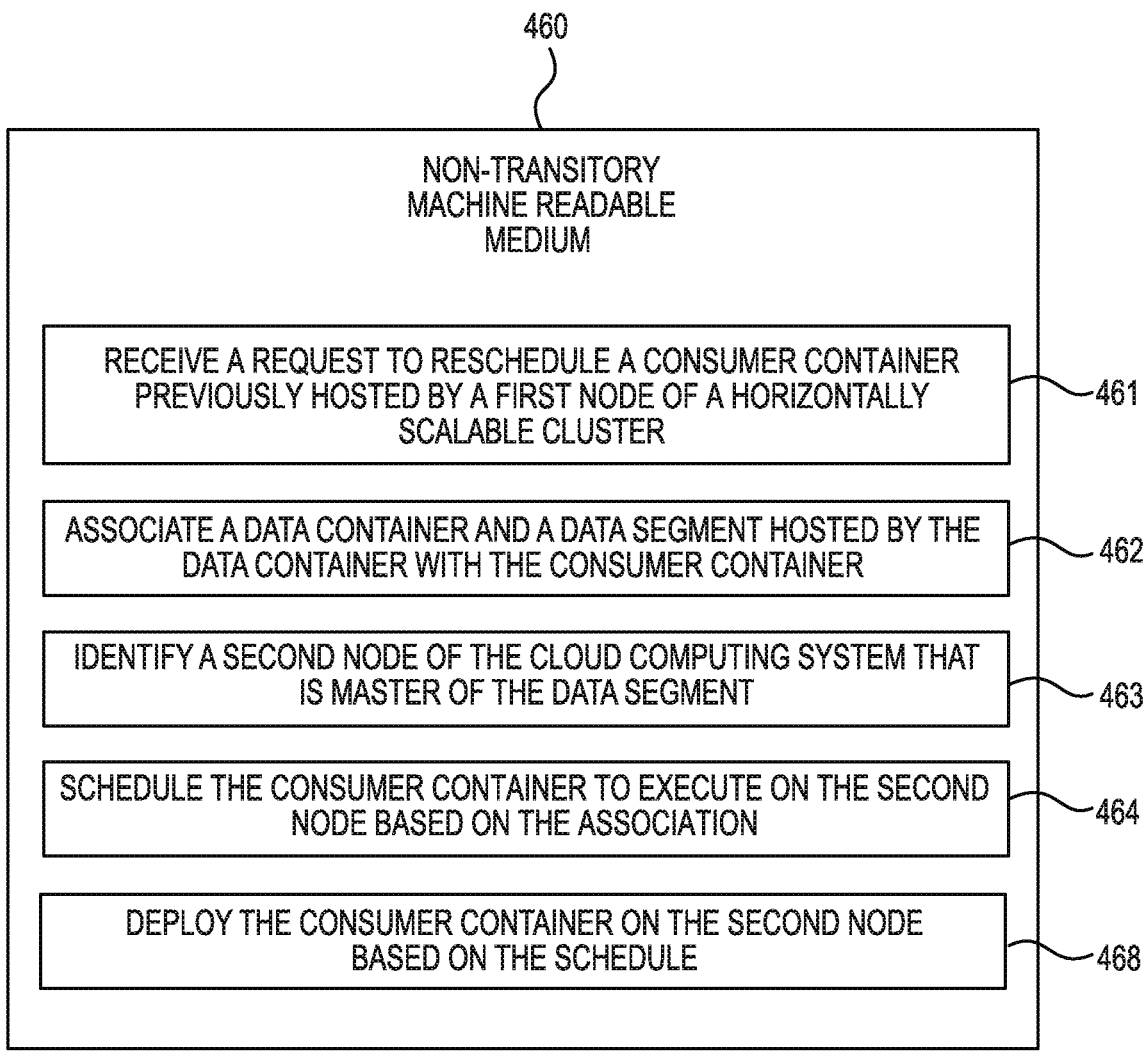
FIG. 4 illustrates an example non-transitory machine-readable medium for scheduling containers on nodes consistent with the disclosure.

FIG. 4 illustrates an example non-transitory machine-readable medium for scheduling containers on nodes consistent with the disclosure. A processing resource may execute instructions stored on the non-transitory machine readable medium 460. The non-transitory machine readable medium 460 may be any type of volatile or non-volatile memory or storage, such as random access memory (RAM), flash memory, read-only memory (ROM), storage volumes, a hard disk, or a combination thereof.

The example medium 460 stores instructions 461 executable by a processing resource to receive a request to reschedule a consumer container previously hosted by a first node of a horizontally scalable cluster. The example medium 460 stores instructions 462 executable by a processing resource to associate a data container and a data segment hosted by the data container with the consumer container. The data container can be associated with the consumer container if the consumer container accesses the data container. The association can be provided by the consumer container. The association can be stored using a data structure which can be used for scheduling.

The example medium 460 stores instructions 463 executable by the processing resource to identify a second node of the cloud computing system that is master of a data segment. The second node can be master of the data segment hosted by the data container if a prior master of the data segment hosted by the data container is unavailable or is unavailable as a master.

The example medium 460 stores instructions 464 executable by the processing resource to schedule the consumer container to execute on the second node based on the association. The consumer container can be scheduled on the second node if the second node has memory resources and processing resource available for the consumer container.

The example medium 460 stores instructions 465 executable by the processing resource to deploy the consumer container on the second node based on the schedule. The consumer container can be deployed by storing the consumer container in memory resources of the second node and by utilizing processing resource to execute the consumer container and provide access to the data container.

In some examples, the request can be generated responsive to an unavailability of the data segment on the first node. The request can be generated responsive to restarting the consumer container. The request can be generated responsive to scaling the consumer container. Scaling the consumer container can include accessing a different data container. Scaling the consumer container can include moving the consumer container to a different node that has the resources requested by the consumer container.

In some examples, a node may be added or removed from a cluster of the cloud computing system. Responsive to removing or adding nodes to a cluster, the data container and/or the consumer container can be moved to a new node and/or a different node as the topology of the cluster changes.

The request can comprise an ID of the consumer container and an ID of the data container or the data segment. In some examples, the request can be received from the first node and/or the second node. The request can also be generated by a node management unit that manages the status of the nodes.

Figure 5:
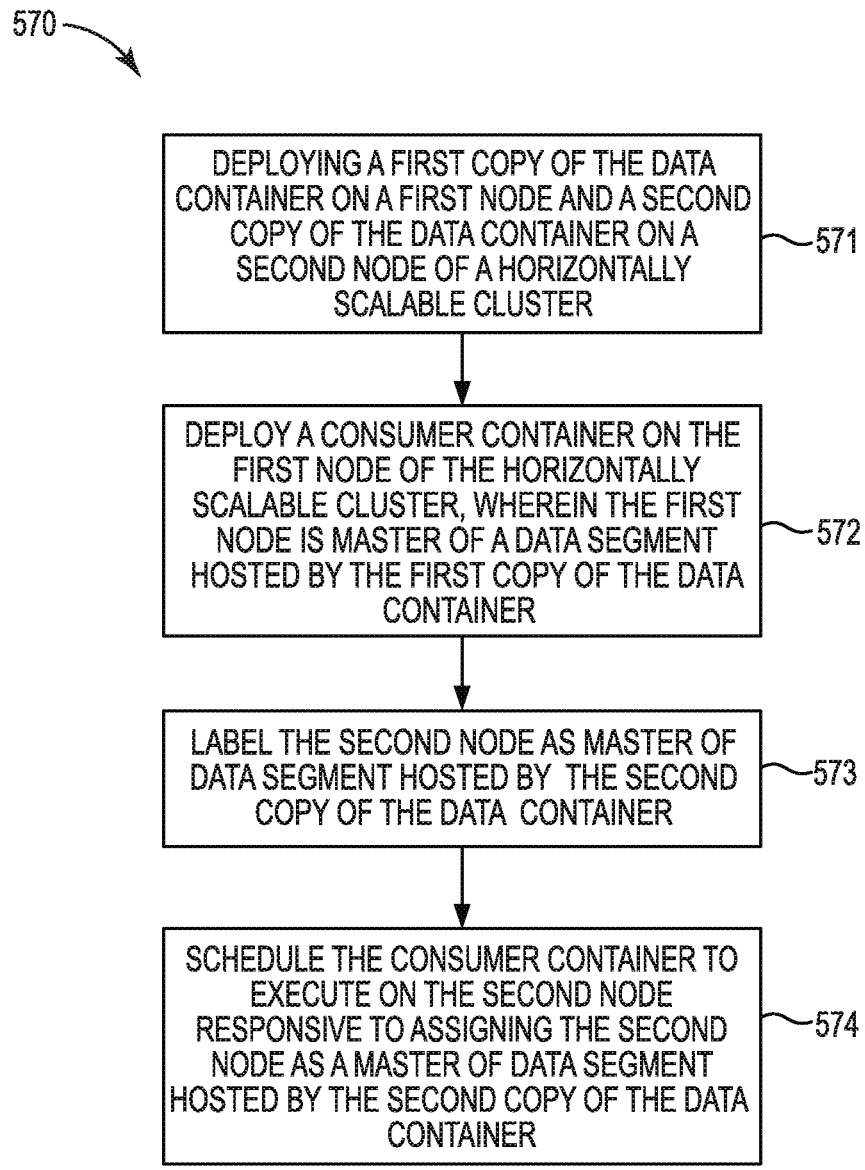
FIG. 5 illustrates an example flow diagram of a method for scheduling containers on nodes consistent with the disclosure.

FIG. 5 illustrates an example flow diagram of a method 570 for scheduling containers on nodes consistent with the disclosure. At block 571, the method 570 includes deploying a first copy of a data container on a first node and a second copy of the data container on a second node of a horizontally scalable cluster. The first copy and the second copy can each include a data segment. A plurality of copies of the data container can be generated to provide for redundancy in case of node failure.

At block 572, the method 570 includes deploying a consumer container on the first node of the horizontally scalable cluster, wherein the first node is a master of a data segment hosted by the first copy of the data container. Each of the copies of the data container can be stored to different nodes in case one of the nodes fails or a copy of the data container becomes corrupted.

At block 573, the method 570 includes labeling the second node as master of the data segment hosted by the second copy of the data container. The master relationship between a node and data container allows for the scheduling of consumer containers on the node. Other nodes that host copies of the data containers but are not labeled as masters of the data container may be ineligible to host consumer containers that access the data container. There can be a number of reasons for the change of master status. For example, the second node can be made master of the data segment responsive to failure of the first node, failure of the data container hosting the data segment, or inaccessibility of the first node, among other possible reasons for the change of master status.

At block 574, the method 570 includes scheduling the consumer container to execute on the second node responsive to assigning the second node as master of the data segment hosted by the second copy of the data container. Executing the consumer container on a node that hosts the data container provides for access to the data segments hosted by the data container without the overhead of providing the data segments through a network.

The second node can be labeled as master of the data segment hosted by the second copy of the data container responsive to an unavailability of the first node. The first node can be made unavailable due to a restart of the first node. In some examples, a second consumer container can be executed on the second node responsive to assigning the second node as a master of the second copy of the data container.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. An apparatus comprising:
a processor;
a memory to store instructions that, when executed by the processor, cause the processor to:
associate a plurality of consumer containers with a data container, wherein the plurality of consumer containers can host workloads that access a data segment hosted by the data container, and wherein the plurality of consumer containers and the data container are schedulable on different nodes of a horizontally scalable cluster;
identify a node of the horizontally scalable cluster that hosts the data container; and
schedule the plurality of consumer containers to execute on the node based on the association between the plurality of consumer containers and the data container.

2. The apparatus of claim 1, wherein the instructions, when executed by the processor, further cause the processor to associate the plurality of consumer containers with the data segment of the data container.

3. The apparatus of claim 2, wherein the instructions, when executed by the processor, further cause the processor to schedule the plurality of consumer containers to execute on the node based on the association between the data segment of the data container and the plurality of consumer containers.

4. The apparatus of claim 2, wherein the instructions, when executed by the processor, further cause the processor to identify a node of a cloud computing system that hosts the data segment.

5. The apparatus of claim 1, wherein the node comprises at least one of a physical computing node and a virtual computing node.

6. The apparatus of claim 1, wherein the data container is a logical container for data segments of a same type.

7. The apparatus of claim 1, wherein each of the plurality of consumer containers is a logical container to access the data segments.

8. The apparatus of claim 1, wherein the instructions, when executed by the processor, further cause the processor to deploy the plurality of consumer containers and the data container on the node based on the schedule.

9. The apparatus of claim 1, wherein the instructions, when executed by the processor, further cause the processor to identify a node of a cloud computing system that hosts the data container and is master of the data segment hosted by the data container.

10. The apparatus of claim 9, wherein instructions, when executed by the processor, further cause the processor to schedule the plurality of consumer containers to execute on the node based on the association between the plurality of consumer containers and the data container and the node being master of the data segment.

11. A non-transitory machine-readable medium storing instructions that, when executed by a processor, cause the processor to:
receive a request to reschedule a consumer container previously hosted by a first node of a cloud computing system, wherein the consumer container can host a workload that accesses a data segment hosted by a data container, and wherein the consumer container and the data container are schedulable on different nodes of the cloud computing system;
associate the data container and the data segment hosted by the data container with the consumer container;

identify a second node of the cloud computing system that is master of the data segment;

schedule the consumer container to execute on the second node based on the association; and deploy the consumer container and on the second node based on the schedule.

12. The non-transitory machine-readable medium of claim 11, wherein the request is generated responsive to an unavailability of the data segment on the first node.

13. The non-transitory machine-readable medium of claim 11, wherein the request is generated responsive to restarting the consumer container.

14. The non-transitory machine-readable medium of claim 11, wherein the request is generated responsive to scaling the consumer container.

15. The non-transitory machine-readable medium of claim 11, wherein the request comprises an identification (ID) of the consumer container and an ID of the data container.

16. The non-transitory machine-readable medium of claim 11, further comprising instructions that, when executed by the processor, further cause the processor to receive the request from one of the first node and the second node.

17. A method, comprising:

deploying a first copy of the data container on a first node and a second copy of the data container on a second node of a horizontally scalable cluster;

deploying a consumer container on the first node of the horizontally scalable cluster, wherein the first node is master of a data segment hosted by the first copy of the data container, wherein the consumer container is configured to host a workload that accesses the data segment hosted by the first copy of the data container;

labeling the second node as master of the data segment hosted by the second copy of the data container; and scheduling the consumer container to execute on the second node responsive to assigning the second node as master of the data segment hosted by the second copy of the data container, wherein the scheduling causes the workload to access the data segment hosted by the second copy of the data container.

18. The method of claim 17, wherein the second node is labeled as master of the data segment hosted by the second copy of the data container responsive to an unavailability of the first node.

19. The method of claim 18, further comprising restarting the first node, wherein the first node is made unavailable responsive to restarting the first node.

20. The method of claim 17, further comprising scheduling a second consumer container to execute on the second node responsive to assigning the second node as master of the data segment hosted by the second copy of the data container.

* * * * *